(12) United States Patent
Jabara et al.

(10) Patent No.: US 10,129,568 B2
(45) Date of Patent: *Nov. 13, 2018

(54) SYSTEM AND METHOD FOR TRANSMISSION OF MULTIPLE VIDEO STREAMS TO MOBILE COMMUNICATION DEVICES

(71) Applicant: Mobilitie, LLC, Newport Beach, CA (US)

(72) Inventors: Gary B. Jabara, Irvine, CA (US); Lloyd Frederick Linder, Agoura Hills, CA (US); David Brett Simon, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/050,332

(22) Filed: Feb. 22, 2016

(65) Prior Publication Data

US 2016/0173913 A1    Jun. 16, 2016

Related U.S. Application Data

(60) Division of application No. 13/834,359, filed on Mar. 15, 2013, now Pat. No. 9,271,054, which is a
(Continued)

(51) Int. Cl.
*H04N 21/214* (2011.01)
*H04N 21/647* (2011.01)
(Continued)

(52) U.S. Cl.
CPC ..... *H04N 21/2143* (2013.01); *H04L 63/0876* (2013.01); *H04L 69/164* (2013.01);
(Continued)

(58) Field of Classification Search
CPC ......... H04N 21/43615; H04N 21/2187; H04N 21/2223; H04N 21/234; H04N 21/2343;
(Continued)

(56) References Cited

U.S. PATENT DOCUMENTS 5,708,961 A    1/1998 Hylton et al.
6,212,208 B1   4/2001 Yoneda et al.
(Continued)

OTHER PUBLICATIONS

International Search Report issued in international application No. PCT/US2014/027586, dated Sep. 16, 2014 (2 pages).
(Continued)

*Primary Examiner* — Hunter B Lonsberry
(74) *Attorney, Agent, or Firm* — Davis Wright Tremaine LLP; Michael J. Donohue (57) ABSTRACT

A video or multimedia distribution system receives multiple video streams and transcodes them into a single stream of data packets with each of the plurality of video data packets for respective ones of the video streams being assigned a port number corresponding to the respective original video stream. The data packets are routed to a plurality of Access Points (APs) for transmission. A User Equipment (UE) communicates with the APs and selects one of the video streams for viewing on the UE by selecting the port number corresponding to the desired video stream. A processor in the UE identifies and stores data packets having the selected port number and plays the video stream on a display. The UE can "change channels" to view other video streams by changing the port number to the port number of the desired video stream.

14 Claims, 7 Drawing Sheets

Related U.S. Application Data continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.

| | | |
|---|---|---|
| *H04W 4/80* | (2018.01) | |
| *H04W 76/40* | (2018.01) | |
| *H04L 29/06* | (2006.01) | |
| *H04W 8/18* | (2009.01) | |
| *H04W 8/20* | (2009.01) | |
| *H04W 12/06* | (2009.01) | |
| *H04W 88/04* | (2009.01) | |
| *H04N 21/643* | (2011.01) | |
| *H04N 21/2187* | (2011.01) | |
| *H04N 21/222* | (2011.01) | |
| *H04N 21/414* | (2011.01) | |
| *H04N 21/61* | (2011.01) | |
| *H04N 21/2343* | (2011.01) | |
| *H04N 21/438* | (2011.01) | |
| *H04N 21/482* | (2011.01) | |
| *H04N 21/234* | (2011.01) | |
| *H04N 21/436* | (2011.01) | |
| *H04N 21/4363* | (2011.01) | |
| *H04N 21/472* | (2011.01) | |
| *H04N 21/84* | (2011.01) | |
| *H04W 84/18* | (2009.01) | |

(52) U.S. Cl.
CPC ..... *H04N 21/2187* (2013.01); *H04N 21/2223* (2013.01); *H04N 21/234* (2013.01); *H04N 21/2343* (2013.01); *H04N 21/41407* (2013.01); *H04N 21/4383* (2013.01); *H04N 21/43615* (2013.01); *H04N 21/43637* (2013.01); *H04N 21/472* (2013.01); *H04N 21/482* (2013.01); *H04N 21/6131* (2013.01); *H04N 21/647* (2013.01); *H04N 21/64322* (2013.01); *H04N 21/64707* (2013.01); *H04N 21/84* (2013.01); *H04W 4/80* (2018.02); *H04W 8/186* (2013.01); *H04W 8/205* (2013.01); *H04W 12/06* (2013.01); *H04W 76/40* (2018.02); *H04W 88/04* (2013.01); *H04L 69/162* (2013.01); *H04W 84/18* (2013.01)

(58) Field of Classification Search
CPC ....... H04N 21/41407; H04N 21/43637; H04N 21/4383; H04N 21/472; H04N 21/482; H04N 21/6131; H04N 21/64322; H04N 21/647; H04N 21/64707; H04N 21/84; H04N 4/008; H04N 8/186; H04N 8/205; H04N 12/06; H04N 76/002; H04N 88/04; H04N 21/2143

See application file for complete search history.

(56) References Cited

U.S. PATENT DOCUMENTS

| | | |
|---|---|---|
| 6,751,673 B2 | 6/2004 | Shaw |
| 6,839,080 B2 | 1/2005 | Meyers |
| 7,230,917 B1 | 6/2007 | Fedorkow |
| 7,970,351 B2 | 6/2011 | Jabara et al. |
| 8,139,581 B1 | 3/2012 | Mraz et al. |
| 8,190,119 B2 | 5/2012 | Jabara et al. |
| 8,565,578 B2 | 10/2013 | Plourde, Jr. |
| 8,752,092 B2 | 6/2014 | Weeks |
| 8,995,923 B2 | 3/2015 | Jabara et al. |
| 9,077,564 B2 | 7/2015 | Jabara et al. |
| 9,179,296 B2 | 11/2015 | Jabara et al. |
| 9,271,054 B2 | 2/2016 | Jabara et al. |
| 2002/0047861 A1 | 4/2002 | LaBrie et al. |
| 2002/0077118 A1 | 6/2002 | Zellner et al. |
| 2002/0105931 A1 | 8/2002 | Heinonen et al. |
| 2003/0106067 A1 | 6/2003 | Hoskins et al. |
| 2003/0159153 A1 | 8/2003 | Falvo |
| 2003/0192055 A1 | 10/2003 | Aoki |
| 2004/0032495 A1 | 2/2004 | Ortiz |
| 2004/0098745 A1 | 5/2004 | Marston et al. |
| 2004/0250273 A1 | 12/2004 | Swix et al. |
| 2005/0041596 A1 | 2/2005 | Yokomitsu et al. |
| 2005/0055708 A1 | 3/2005 | Gould et al. |
| 2005/0152287 A1 | 7/2005 | Yokomitsu et al. |
| 2006/0053448 A1 | 3/2006 | Reichardt |
| 2006/0075449 A1 | 4/2006 | Jagadeesan et al. |
| 2006/0085834 A1* | 4/2006 | Chang ............... H04N 7/106 725/115 |
| 2006/0161960 A1 | 7/2006 | Benoit |
| 2006/0288375 A1 | 12/2006 | Ortiz et al. |
| 2007/0008435 A1 | 1/2007 | Sung |
| 2007/0055989 A1 | 3/2007 | Shanks et al. |
| 2007/0089145 A1 | 4/2007 | Medford |
| 2007/0094691 A1 | 4/2007 | Gazdzinski |
| 2007/0107034 A1 | 5/2007 | Gotwals |
| 2007/0204294 A1* | 8/2007 | Walker ............... H04L 12/18 725/38 |
| 2007/0288978 A1 | 12/2007 | Pizzurro et al. |
| 2008/0022352 A1 | 1/2008 | Seo et al. |
| 2008/0036851 A1 | 2/2008 | Patel |
| 2008/0060025 A1 | 3/2008 | Chen |
| 2008/0068252 A1 | 3/2008 | Mehta |
| 2008/0092202 A1 | 4/2008 | Greenquist et al. |
| 2008/0104642 A1 | 5/2008 | Galipeau et al. |
| 2008/0127257 A1 | 5/2008 | Kvache |
| 2008/0151885 A1 | 6/2008 | Horn et al. |
| 2008/0212583 A1 | 9/2008 | Rey |
| 2008/0253368 A1 | 10/2008 | Rasanen |
| 2008/0301744 A1 | 12/2008 | Hutchings |
| 2008/0313691 A1 | 12/2008 | Cholas et al. |
| 2009/0041118 A1 | 2/2009 | Pavlovskaia et al. |
| 2009/0064246 A1 | 3/2009 | Bell |
| 2009/0077267 A1 | 3/2009 | Alrabady et al. |
| 2009/0183217 A1 | 7/2009 | Mukerji |
| 2009/0199254 A1 | 8/2009 | White |
| 2009/0217318 A1 | 8/2009 | VerSteeg et al. |
| 2009/0222854 A1 | 9/2009 | Cansler |
| 2009/0282438 A1 | 11/2009 | White |
| 2010/0020794 A1 | 1/2010 | Cholas et al. |
| 2010/0023842 A1 | 1/2010 | Rahrer et al. |
| 2010/0070997 A1 | 3/2010 | Friedman |
| 2010/0077436 A1 | 3/2010 | Barnes et al. |
| 2010/0080163 A1 | 4/2010 | Krishnamoorthi et al. |
| 2010/0192183 A1 | 7/2010 | Hu |
| 2010/0195623 A1 | 8/2010 | Narasimhan et al. |
| 2010/0226288 A1 | 9/2010 | Scott et al. |
| 2010/0227554 A1 | 9/2010 | Jabara et al. |
| 2010/0242075 A1 | 9/2010 | Vimpari et al. |
| 2010/0293301 A1 | 11/2010 | Amini et al. |
| 2010/0306801 A1 | 12/2010 | Filippov et al. |
| 2011/0066745 A1 | 3/2011 | Olsson et al. |
| 2011/0103374 A1 | 5/2011 | Lajoie et al. |
| 2011/0158146 A1 | 6/2011 | Poola et al. |
| 2012/0062800 A1 | 3/2012 | Sisto et al. |
| 2012/0077466 A1 | 3/2012 | O'Mahony et al. |
| 2012/0137332 A1 | 5/2012 | Kumar |
| 2012/0140645 A1 | 6/2012 | Bonta et al. |
| 2012/0144445 A1 | 6/2012 | Bonta et al. |
| 2012/0151075 A1 | 6/2012 | Mraz et al. |
| 2012/0202565 A1 | 8/2012 | Lapstun et al. |
| 2013/0036234 A1 | 2/2013 | Pazos |

(56) References Cited

U.S. PATENT DOCUMENTS

| | | |
|---|---|---|
| 2013/0083843 A1 | 4/2013 | Bennett |
| 2013/0205341 A1 | 8/2013 | Jabara et al. |
| 2013/0305297 A1 | 11/2013 | Jabara et al. |
| 2014/0157325 A1 | 6/2014 | Jabara et al. |
| 2014/0344847 A1 | 11/2014 | Jabara et al. |
| 2015/0106855 A1 | 4/2015 | Jabara et al. |
| 2016/0173956 A1 | 6/2016 | Jabara et al. |

OTHER PUBLICATIONS

International Search Report issued in international application No. PCT/US2014/027606, dated Dec. 9, 2014 (5 pages).
International Search Report issued in international application No. PCT/US2014/027629, dated Aug. 19, 2014 (3 pages).
SONICblue, ReplayTV 5000, User Guide, 2002, 86 pages.

* cited by examiner

SYSTEM AND METHOD FOR TRANSMISSION OF MULTIPLE VIDEO STREAMS TO MOBILE COMMUNICATION DEVICES

RELATED APPLICATIONS

This application is a divisional of U.S. patent application Ser. No. 13/834,359, filed on Mar. 15, 2013, now U.S. Pat. No. 9,271,054 which is a continuation-in-part of U.S. patent application Ser. No. 13/363,943, filed on Feb. 1, 2012, now U.S. Pat. No. 9,179,296, which is a continuation-in-part of U.S. patent application Ser. No. 13/093,998, filed on Apr. 26, 2011, now U.S. Pat. No. 8,995,923, which is a continuation-in-part of U.S. patent application Ser. No. 12/958,296, filed on Dec. 1, 2010, now U.S. Pat. No. 9,077,564, which is a continuation-in-part of U.S. patent application Ser. No. 12/616,958, filed on Nov. 12, 2009, now U.S. Pat. No. 8,190,119, which is a continuation-in-part of U.S. patent application Ser. No. 12/397,225, filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of video streaming of multiple video channels using wireless communication devices.

Description of the Related Art

Wireless communication networks have become commonplace. A vast array of base stations is provided by a wireless service provider to form a public mobile land network (PLMN). A number of known PLMNs are provided by different service providers and may or may not be compatible with each other depending on the particular implementation of the network. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In a typical situation, the individual wireless communication devices communicate with one or more base stations. Even when two wireless communication devices are located a few feet from each other, there is no direct communication between the wireless devices. That is, the wireless devices communicate with each other via one or more base stations and other elements of the respective PLMNs of the two wireless communication devices.

Conventional personal computers (PC) typically include one or more wireless interfaces, such as Bluetooth and WiFi, to permit the easy connection of external devices to the PC (using Bluetooth, for example) or to simplify the implementation of a home network with wireless routers (using WiFi, for example) that establish a communication link between the PC and the router to thereby provide network access. The same WiFi connections are often used on laptop PCs to gain network access (e.g., the Internet) in hotels, airports, coffee shops, and the like. As is known in the art, the user must search for an available wireless network and select one of the available networks for connection thereto. Sometimes, a password and encryption are required to connect to the selected network.

State of the art mobile communication devices typically include a network transceiver to communicate with the service provider PLMN, as described above, and one or more short-range transceivers, such as Bluetooth and WiFi. The Bluetooth transceiver is often used to establish a connection with an automobile sound system to facilitate hands-free communication with the service provider PLMN using the network transceiver. The WiFi interface in the mobile communication devices can be used to provide network access (e.g., the Internet) in the same manner described above with respect to PCs and laptop computers. That is, the user must search for an available wireless network and select one of the available networks for connection thereto.

A new family of computing devices, such as tablet computers and electronic readers, have wireless communication capability as well. In some cases, the computing devices include both network transceivers and short-range transceivers, such as those described above. As can be appreciated, the PLMN implementation typically requires a contract with a service provider. In some tablet computers and electronic readers, the network transceiver has been eliminated, thus eliminating the need for a service provider contract, but also eliminating the ability to communicate via the service provider PLMN. With this type of device, network access is available only through a short-range transceiver that communicates with an access point (AP), such as may be found in hotels, airports, coffee shops, and the like. The APs are typically implemented as wireless access points and the portable computing device must connect to the AP in the same manner described above with respect to PCs and laptop computers. That is, the user must search for an available wireless network and select one of the available networks for connection thereto.

A popular use for network access is to download video or multimedia data. As can be appreciated by those skilled in the art, a request or demand for multimedia data requires a significant amount of bandwidth. In a public setting, such as an airport, simultaneous or overlapping requests for on-demand video will cause a slow down in the delivery of data to all devices connected to the particular AP.

Therefore, it can be appreciated that there is a need for the delivery of streaming video from APs to wireless communication devices in an effective manner without causing a slow down at the AP. The present invention provides this, and other advantages, as will be apparent from the following detailed description and accompanying figures.

DETAILED DESCRIPTION OF THE INVENTION

Figure 1:
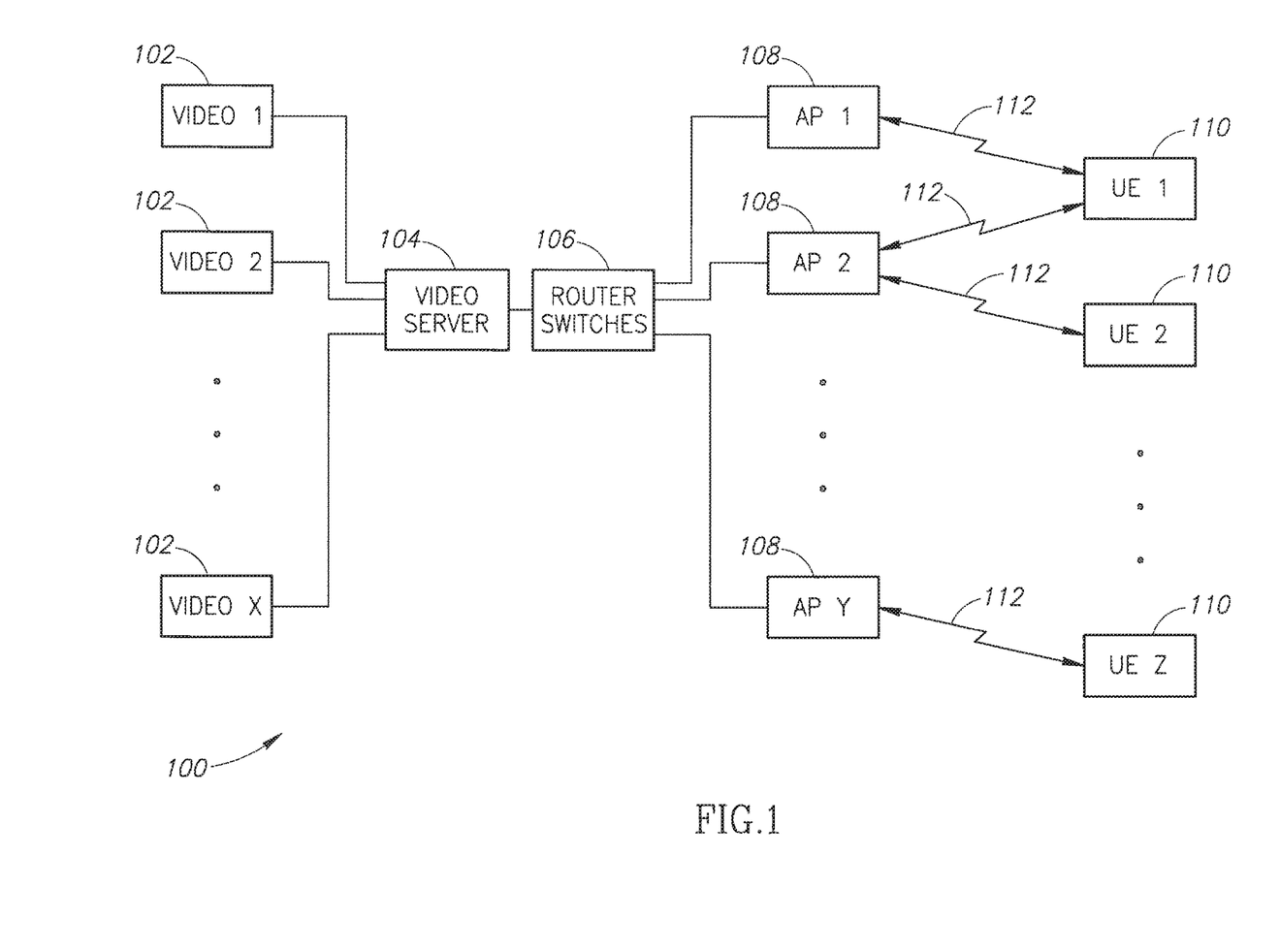
FIG. 1 is an example of network architecture of a dynamic network illustrating communication between user equipment and wireless access points.

The system described herein permits the distribution of a multiple video channels through one or more wireless access points for reception by a plurality of wireless communication devices. FIG. 1 illustrates a system 100 that illustrates an exemplary embodiment of the video distribution system. In the system 100, a plurality of video sources 102 are illustrated in FIG. 1 as VIDEO 1, VIDEO 2, VIDEO X. The video sources 102 may be live video, such as produced by a video camera, or may be remote video feeds, such as provided by a television network. Then video feed could also be an instant replay channel under control of a server.

A video server 104 is configured to receive the individual video streams from the video sources 102. The video server 104 is implemented by one or more conventional computing devices. The general operation of a server is well known in the art and need not be described herein except as related to the specific video processing.

The video server 104 processes the multiple individual video streams and creates a single stream of video data packets. In an exemplary embodiment, the video server 104 creates a single stream video data packet in accordance with a User Datagram Protocol (UDP), which is a conventional Internet communication protocol. As is known in the art, UDP is a simple transmission protocol with no handshaking and no integrated error correction capabilities. On the other hand, UDP is useful in time-sensitive applications where the error correction capabilities provided by other protocols, such as TCP, are undesirable.

UDP also provides for port numbers to be included in each UDP data packet. In accordance with the present disclosure, the video server 104 creates video data packets for each of the video streams from the video sources 102 but assigns a different port number for each of the respective video sources. For example, VIDEO 1 will be packetized into a stream of UDP packets where each of the packets corresponding to the VIDEO 1 stream has the same port number. In contrast, the VIDEO 2 is encoded into a plurality of UDP data packets, but uses a different port number than the VIDEO 1 data stream. Thus, the video server 104 encodes each video stream into separate UDP packets where the UDP packets corresponding to each video stream are assigned different port numbers.

In this manner, the video server 104 creates a single stream of UDP packets where the individual packets have different port numbers that correspond to the video streams from the respective video sources 102. The stream of UDP packets are routed through an infrastructure 106 to a plurality of wireless access points (APs) 108. The particular form of the infrastructure 102 depends on the specific implementation of the system 100. However, the infrastructure 106 typically includes routers, switches, and may include a gateway. The function of the infrastructure 106 is to route the UDP video packets from the video server 104 to one or more of the APs 108. In addition, the infrastructure 106 routes data from the APs 108 to the video server 104.

In FIG. 1, the APs 108 are illustrated as AP 1, AP 2, AP Y. In an exemplary embodiment, the UDP video data packets are routed to all the APs 108 such that each AP receives the same video data packets. In an alternative embodiment, the data packets for different video sources can be routed to selected ones of the APs 108. For example, all UDP packets with a port number corresponding to the VIDEO 1 data stream can be routed only to AP 1 and AP 2. In contrast, the UDP data packets with a port number corresponding to the VIDEO 2 stream can be routed to all APs 108. Thus, the system 100 has the ability to selectively route the UDP video packets to one or more of the APs 108 under control of the video server 104. In addition, the APs 108 must be configured to broadcast UDP data frames and not block the broadcast of any UDP data frames.

FIG. 1 also illustrates a plurality of wireless communication devices, sometimes referred to as user equipment (UE) 110. The term UE is intended to include any wireless communication device capable of processing audio, video, and text messaging. This includes smart phones, that may or may not include a network transceiver for communication with a public land mobile network (PLMN), laptops, PDAs, computer tablets (e.g., an iPad™), and the like. The system 100 is not limited by the particular form of the communication device.

In FIG. 1, the UEs 110 are illustrated as UE1, UE2, . . . UE Z. As will be described in greater detail below, the UEs 110 include programming that allows the individual UEs 110 to selectively receive UDP data packets having a single selectable port number. Thus, each UE 110 can select a particular video stream for viewing on a display of the UE 110 by selecting the port number corresponding to the desired video stream.

The UEs 110 may be able to establish a communication link with more than one AP 108. As illustrated in FIG. 1, UE 1 can communicate with both the AP 1 and AP 2 via respective wireless communication links 112. FIG. 1 illustrates UE 2 as coupled only to the AP 2 via wireless communication link 112 while UE Z communicates with AP Y via wireless communication link 112. Thus, the UEs 110 are in wireless communication with one or more of the APs 108.

Those skilled in the art will appreciate that the APs 108 are multicasting multiple video channels to any UE 110 within range of an AP. This multicast approach is in contrast to conventional unicast streaming. In unicast streaming, the AP 108 receives a data stream for each individual UE 110. The requirement of one video stream for each end user will quickly consume all of the available bandwidth for the AP. In contrast, the UDP multicasting in accordance with the system 100 described herein makes video streams available for an unlimited number of UEs 110 that may be connected to an AP 108. The approach overcomes the bandwidth limitations of unicast streaming. In addition, as will be described in greater detail below, the application associated with the UDP multicast streaming functions as an equivalent to a TV guide for watching different channels or video streams broadcast from the AP 108. A display on the UE 110 can be dynamically configured by the video server 104. In addition to the video streams, the video server 104 can also send out a list of channels that are being provided via the APs 108. Thus, the number of video streams from different video sources 102 is limited by the bandwidth capacity of a particular AP 108. As APs 108 use improved technology, the number of video sources 102 available for multicast streaming can also increase accordingly. However, the number of available video streams is not limited by the number of UEs 110 receiving data from any particular AP 108. That is, the number of UEs 110 receiving data from a particular AP 108 is unlimited. Thus, the number of UEs 110 viewing video streams is effectively detached from the bandwidth limitation of the AP 108 itself. The system 100 permits the equivalent of broadcast television on the display 154 (see FIG. 1) as opposed to a classical television screen.

In operation, the video server 104 can receive the various video streams from the video sources 102 in different formats. However, those skilled in the art will appreciate that certain formats may simplify the process of transcoding from a video stream to the UDP video packets. In an exemplary embodiment, the video data is formatted in accordance with MPEG-2. If the data is multimedia data, the audio data is formatted in accordance with MPEG standards. If the video sources 102 provide video in the MPEG-2 video format, the video server need not perform any conversion. Furthermore, there are other optimization settings that are imposed by the video server 104, or more may already be provided by the video sources 102. For example, a video frame rate of 24-30 frames per second provides a relatively smooth video display on the UE 110. In another example of optimization settings, the video server 104 may provide the video data at a rate of 64,000 bits per second (bps) to 300,000 bps. The audio signal may be sampled at approximately 32,000 bps. A video size of 320 pixels by 240 pixels or smaller is generally satisfactory for the typical display 154 on the UE 110. As noted above, the video sources 102 may already provide the data in this format. If the video sources 102 provide video data as an analog signal, the video server 104 must process the data accordingly.

In an exemplary embodiment, the video server 104 utilizes MPEG-TS, which refers to a conventional encoding process for a transport stream. The video server 104 provides UDP broadcast streaming and uses a UDP broadcast address that is computed using the net mask and IP address. Those skilled in the art will appreciate that when a device connects to a WiFi source, such as the AP 108, it receives setting backs that include a submet net mask, IP address, and gateway. The broadcast address is processed in a conventional manner using this data. Current APs 108 may be configured for operation in accordance with IEEE 802.11n. These devices are dual-banned (i.e., 2.4 GHz and 5 GHz). In addition, many access points are designed for operation with multiple input-multiple output (MIMO) antenna configurations. Under ideal conditions, such dual-band AP 108 can generally support 10 or more video streams with each video stream requiring approximately 1 megabit per second (Mbps). Those skilled in the art will appreciate that the distance between the Ap 108 and the UE 110 is a significant factor for data throughput rates. However, in a typical venue 200, such as described herein, a large number of APs 108 can be positioned to provide a high quality signal level to the UE 110.

Figure 2:
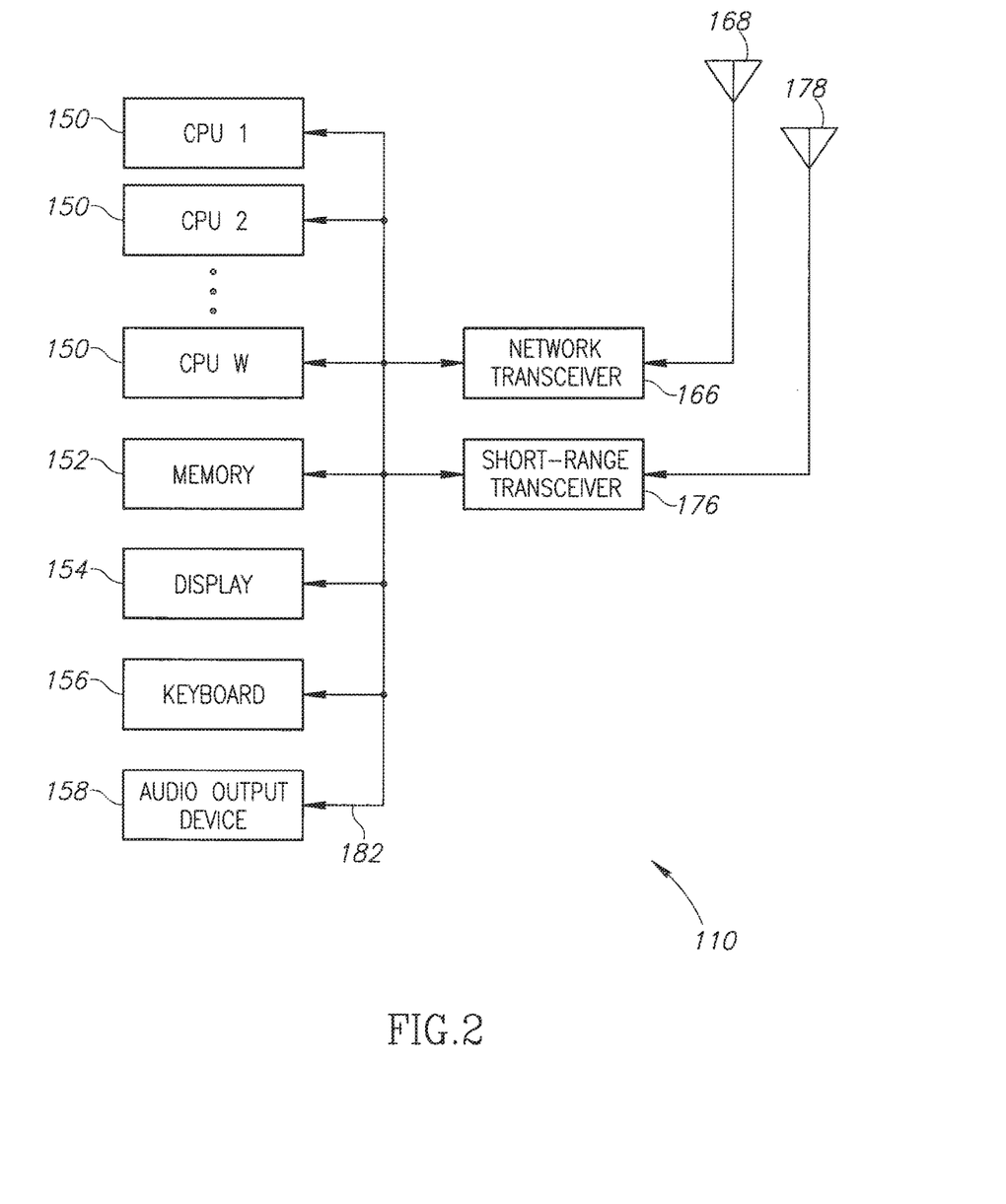
FIG. 2 is functional block diagram of one of the wireless communication devices of FIG. 1.

FIG. 2 is a functional block diagram illustrative of one of the UEs 110 illustrated in FIG. 1. The system 100 takes advantage of current implementations of the UE 110 that typically include multiple processors. As will be described in greater detail below, one processor in the UE is configured to handle communications with the AP 108 while a second processor is configured for playback of received video data. The UE 110 in FIG. 2 includes a plurality of central processing units (CPUs) 150. The CPUs 150 are illustrated in FIG. 2 as CPU 1, CPU 2, . . . CPU W. Those skilled in the art will appreciate that the CPUs 150 may be implemented as conventional microprocessors, an application specific integrated circuit (ASIC), digital signal processor (DSP), programmable gate array (PGA), or the like. The UE 110 is not limited by the specific form of the CPUs 150.

The UE 110 in FIG. 2 also contains a memory 152. In general, the memory 152 stores instructions and data to control operation of the CPUs 150. The memory 152 may include random access memory, read-only memory, programmable memory, flash memory, and the like. The UE 110 is not limited by any specific form of hardware used to implement the memory 152. The memory 152 may also be integrally formed in whole or in part with the CPUs 150.

The UE 110 of FIG. 2 also includes conventional components, such as a display 154, a keypad or keyboard 156, and an audio output device 158. In many UEs 110, the display 154 is a touch-sensitive display that incorporates the functionality of the display 154 and the keyboard 156. These are conventional components that operate in a known manner and need not be described in greater detail. Other conventional components found in wireless communication devices, such as a USB interface, Bluetooth interface, camera/video device, infrared device, and the like, may also be included in the UE 110. For the sake of clarity, these conventional elements are not illustrated in the functional block diagram of FIG. 2.

In some embodiments, the UE 110 of FIG. 2 also includes a network transceiver 166 such as may be used by the UE 110 for the conventional wireless communication network with the service provider PLMN (not shown), as described above. The network transceiver 166 is connected to an antenna 168. The network transceiver 166 is illustrated as a generic transceiver. The UEs 110 may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the PLMN (not shown) is well-known in the art and need not be described in greater detail herein.

The UE 110 of FIG. 2 also includes a short-range transceiver 176 that is used by the UEs 110 to communicate with the APs 108 of FIG. 1. The short-range transceiver 176 is connected to an antenna 178. In an exemplary embodiment, the antennas 168 and 178 may have common components are implemented as a single antenna.

The various components illustrated in FIG. 2 are coupled together by a bus system 180. The bus system may include an address bus, data bus, power bus, control bus, and the like. For the sake of convenience, the various busses in FIG. 2 are illustrated as the bus system 180.

In an exemplary embodiment, the short-range transceiver 176 may be designed for operation in accordance with IEEE standard 802.11, sometimes referred to as WiFi. Most modern wireless communication devices are equipped with WiFi and may be readily upgraded to support the functionality described herein. A technique for establishing communication between the UEs 110 and the APs 108 using WiFi is described in U.S. patent application Ser. No. 12/397,225, filed on Mar. 3, 2009, now U.S. Pat. No. 7,970,351. Because the UEs 108 all include WiFi capability, the UEs may be designed for communication with the APs 108, regardless of the type of service provider PLMN or, indeed, in the total absence of the network transceiver 166 (see FIG. 1). Thus, the UE 110 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

Various techniques for establishing the short-range communication links 112 (see FIG. 1) are described in U.S. patent application Ser. No. 12/397,225, filed on Mar. 3, 2009, now U.S. Pat. No. 7,970,351, U.S. patent application Ser. No. 12/616,958, filed on Nov. 12, 2009, now U.S. Pat.

No. 8,190,119, U.S. patent application Ser. No. 12/958,296, filed on Dec. 1, 2010, now U.S. Pat. No. 9,077,564, U.S. patent application Ser. No. 13/093,998, filed on Apr. 26, 2011, now U.S. Pat. No. 8,995,923, and U.S. patent application Ser. No. 13/363,943, filed on Feb. 1, 2012, now U.S. Pat. No. 9,179,296, the entire disclosures and content of which are hereby incorporated by reference in their entirety.

The user of a conventional wireless communication device can search for a wireless access point and connect to that access point, as is common in public areas, such as an airport terminal, coffee shop, or the like. The goal of this connection is generally to provide Internet access. However, the UEs 110 described herein can include an application program interface (API) that can be programmed into the UE at the time of manufacture or downloaded in a conventional manner. Some functionality of the API will be described herein. A more complete description of the API is provided by U.S. patent application Ser. No. 13/093,998, now U.S. Pat. No. 8,995,923, and titled "System and Method for Management of a Dynamic Network Using Wireless Communication Devices," filed on Apr. 26, 2011, and incorporated herein by reference in its entirety. The API becomes part of the operating system in that it is always executing in the background. In this manner, the API is different from a conventional application software program that must be activated by the user. In one aspect, the API includes a "heartbeat" signal that periodically communicates with any available AP 108 and provides identification data, location data and the like to a database server 232 (see FIG. 4). In addition, the API advantageously simplifies authentication of the UE whenever it enters a venue that is part of the system described herein.

In FIG. 1, the UE 1 has established the wireless communication links 112 with the AP 1 and AP 2, respectively. As the user moves from one location to another in a particular venue, he may move in or out of range of one AP 108 or the other. Thus, the UE 110 can receive the video stream from one of the plurality of APs 108 distributed throughout the venue.

In operation, the API or a separate application program provides a set of instructions to two of the CPUs 150 to perform specific tasks. In particular, a first processor (e.g., CPU 1) is programmed with native code to perform the task of capturing data packets received from the APs 108 and storing the received data packets. As used herein, the term "native code" refers to software code that has been compiled to processor-specific machine code. In the example described herein, CPU 1 is responsible for capturing all data packets that have a specified port number. The CPU 1 is programmed to provide the singular function of capturing UDP data packets having the designated port number and storing those captured data packets in the memory 152.

While the CPU 1 is programmed with native code to perform the function of capturing and storing UDP data packets, a second processor (e.g., the CPU 2) is also programmed with native code to perform the function of retrieving the stored data packets and playing them on the display 154. In addition, if the captured video stream is a multimedia stream, the CPU 2 also provides audio data to the audio output device 158.

In one embodiment, the CPU 1 stores the UDP data packets for a short time and then closes the file in which the received data packets are stored. This permits a second processor, the CPU 2, to open the file and play back the received data packets on the display 154. In this embodiment, the CPU 1 saves the received UDP data packets as a series of files that are closed after a short period of time while the CPU 2 opens the closed files and plays the received UDP packets on the display. If the received data packets are multimedia data packets, the CPU 2 also sends data to the audio output device 158.

In an alternative embodiment, the operation of the CPU 1 and CPU 2 is tightly integrated so that both the CPU 1 and the CPU 2 can access the same file in the memory 152. In this embodiment, there is only a single data file with the CPU 1 placing received data packets in the data file in the memory 152 while the CPU 2 retrieves and plays the data packets from the single data file in the memory 152 on the display 154 and the audio output device 158 if the video stream is a multimedia file.

The efficient native code programming of the CPU 1 and CPU 2 allows the UE 110 to effectively capture and play back a video data stream. In the UE 110, the CPU 1 is programmed for the singular function of capturing and storing UDP data packets while the CPU 2 is programmed for the singular function of retrieving and playing the stored UDP data packets. The tight operation of the CPU 1 and CPU 2 permit the effective capture and play of UDP data packets at an acceptable frame rate to effectively provide streaming video or streaming multimedia to the UE 110 from the APs 108 within a venue.

Figure 3:
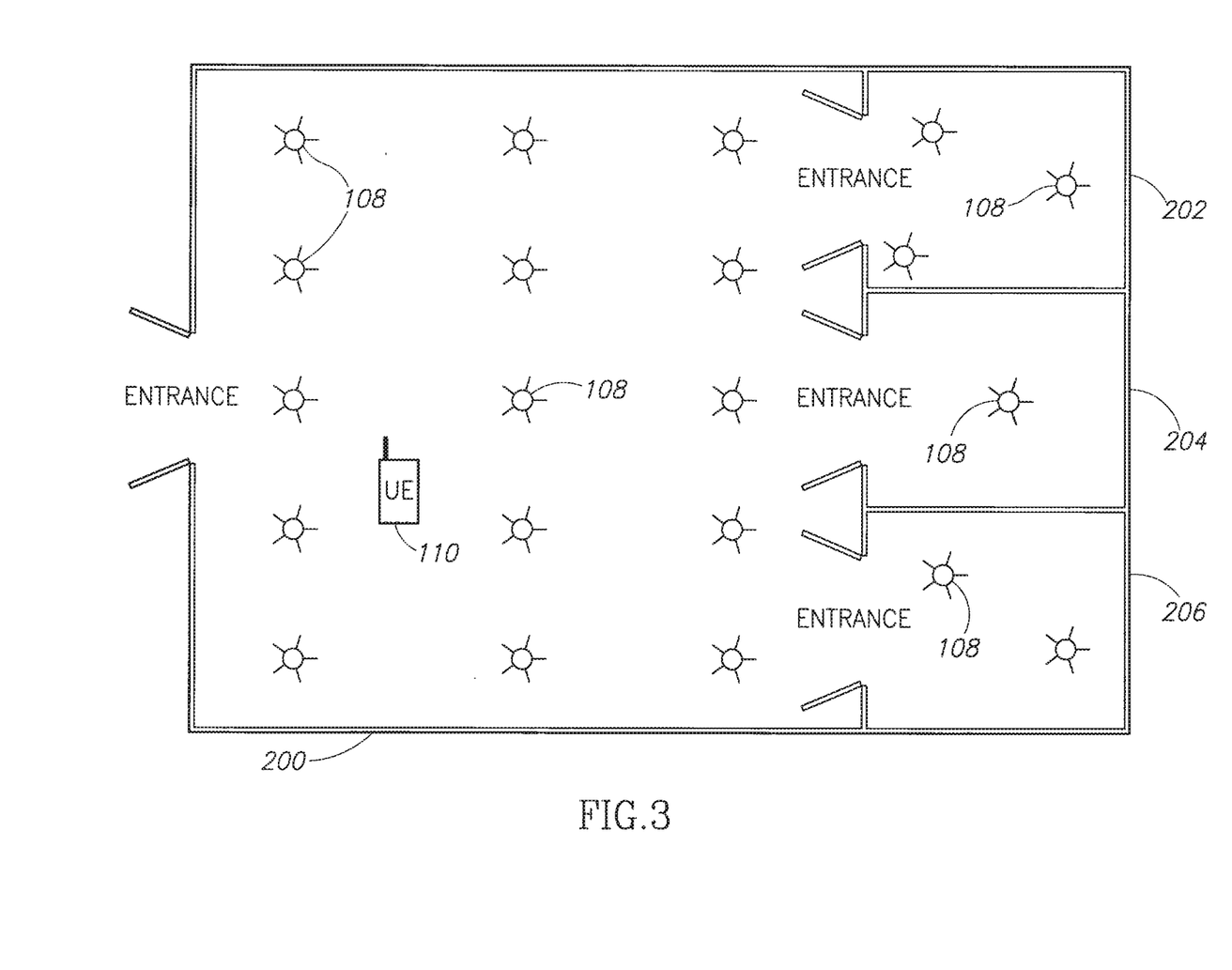
FIG. 3 illustrates a venue with a large number of distributed wireless access points.

FIG. 3 illustrates a large venue 200, such as a casino. In such a large venue, there may be related businesses 202-206 located within or near the venue 200. In the casino example, the related business 202 may be a performance venue for singers, comedy acts, and the like. The related business 204 may be a nightclub while the related business 206 may be a restaurant.

Due to the large size of the venue 200, it may be necessary to deploy a network of APs 108. The position and coverage area of the APs 108 can be determined based on the particular hardware implementation. The actual distribution and installation of the APs 108 using the infrastructure 106 (see FIG. 1) within the venue 200 is within the engineering knowledge of one skilled in the art and need not be described in greater detail herein.

In the embodiment of FIG. 3, all of the APs 108 are coupled to the video server 104 in FIG. 1. As the UE 110 moves throughout the venue 200, it is making and breaking wireless communication devices with one or more of the APs 108. Thus, the UE 110 can receive a selected streaming video channel anywhere within the venue 200.

The identity of the UE 110 can be verified by the UE providing a profile and user information and signing up for the WiFi service and downloading the API. Initially this may be accomplished through a portal page, as will be described in greater detail below.

Once the identity of the UE 110 has been verified, the video server 104 can provide a selection of available video streams. For example, a selection of available video streams may be shown on the display 154, which may also be a touch-sensitive display. In a typical embodiment, there is a short description of the video stream along with a selection button shown on the display 154. The user simply taps the display 154 near the description of the desired video stream. The port number associated with the selected video stream is supplied to the CPU 1 to begin the video streaming process. In an exemplary embodiment, the CPU 1 and CPU 2 may use progressive downloading so that a short segment of the video stream is captured by the CPU 1 before the CPU 2 begins the play-out process. This allows a smoother transition to video streaming and avoids any initial buffer starvation. In the casino venue 200 illustrated in the example of FIG. 3, the available video streams could be parimutuel events (i.e., horse races), sporting events (e.g., football, baseball, basketball, etc.), instructional videos, such as rules and/or tips on playing certain games within the casino, or the like. The user simply taps the display 154 near the desired video stream and the video streaming will begin. While the UE 110 remains within the venue 200, it is in substantially continuous contact with the APs 108 and may receive data therefrom. During a lull in activity in the video streaming, such as a timeout in the sporting event, the venue may provide its own advertising or other information to the UE 110. The ads may take the form of still images, videos similar to commercial television ads, or the like. The received videos can also have banner ads included or the video server 104 (see FIG. 1) can modify the video feeds to include advertising spliced into the video feed. This requires video processing equipment that is known in the art for this purpose. Furthermore, the heartbeat data, described above, can be used to provide a personal targeted advertising for an individual UE 110 as part of a streaming video on a particular channel. For example, the UE 110 could receive an ad for free or discounted tickets to the performance venue 202 or an invitation to happy hour at the nightclub venue 204 or a discounted meal at the restaurant venue 206. If the owner of a UE 110 is not a registered guest at a hotel within the venue 200, the APs 108 could send an invitation or ad to book a room in the venue 200. The UE 110 can communicate with the video server 104 or another server (not shown) within the venue 200 via the APs 108 to accept one or more of the ad offers. For example, the UE 110 could transmit an acceptance and book tickets at the performance venue 202. Similarly, the user of the UE 110 can book a room in the venue 200.

Figure 4:
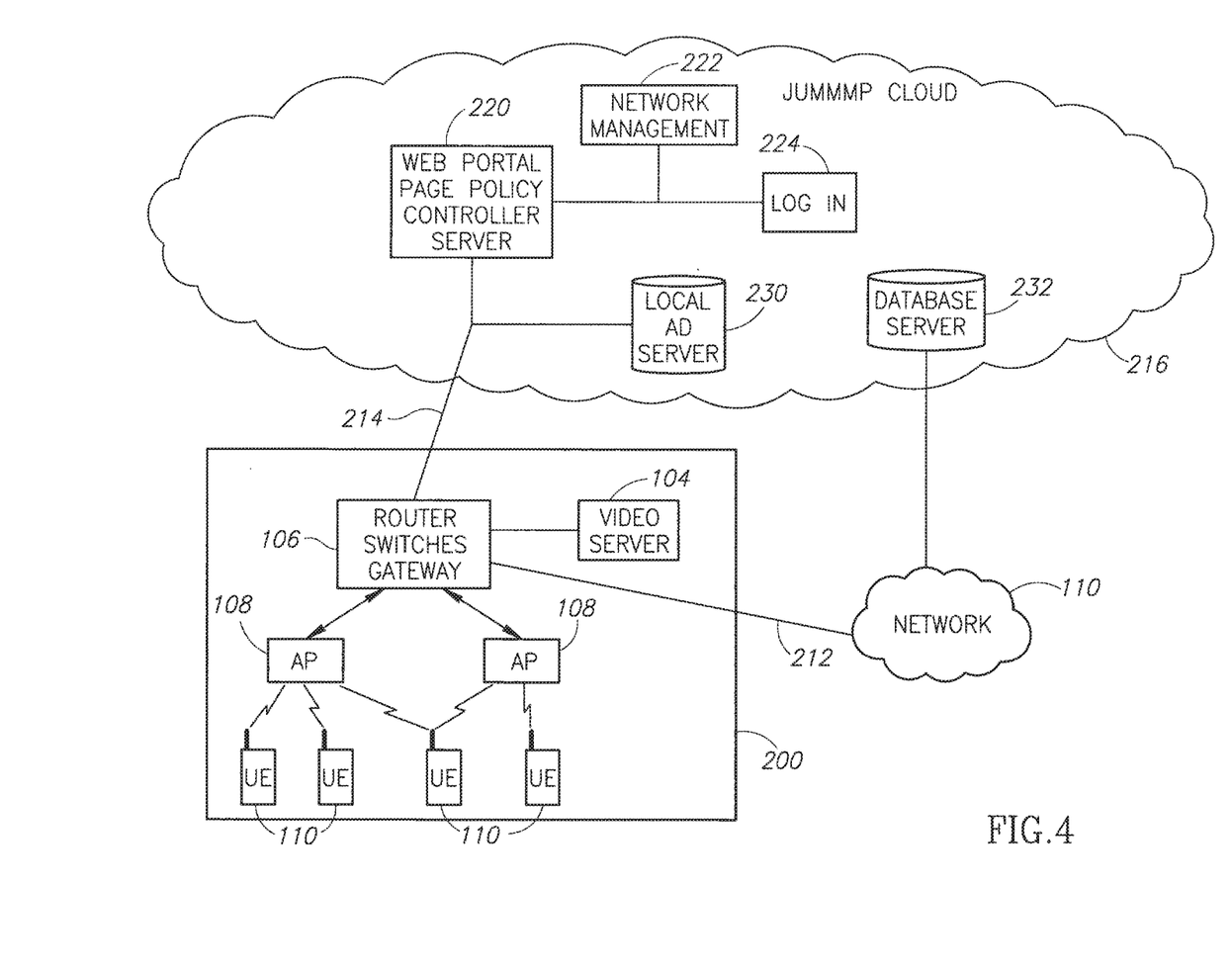
FIG. 4 illustrates a system architecture in which a venue communicates with a Cloud network.

FIG. 4 illustrates a system architecture that allows operation of the system 100 across multiple venues. As discussed above with respect to FIG. 3, the venue 200 may have a large number of APs 108 distributed throughout the venue. The various APs 108 are coupled together using the infrastructure 106. Among other things, the infrastructure allows an interconnection to a network 210 via a communication link 212. In a typical embodiment, the network 210 may be implemented as the Internet. In addition to the communication link 212, the infrastructure 106 provides a backhaul 214 to a cloud computing environment designated herein as a JUMMMP Cloud 216. The backhaul 214 may be implemented in a variety of different manners using known technology. In one embodiment, the backhaul 214 may be routed to the JUMMMP Cloud 216 via the network 210.

Within the JUMMMP Cloud 216 are a number of components. A web portal page and policy controller server 220 controls user authentication across a number of different venues in addition to the venue 200. A network management element 222 controls overall operation of the network in the JUMMMP Cloud 216 including registration and authentication services. FIG. 4 illustrates a log-in web page 224.

A local ad server 230 in the JUMMMP Cloud 216 may provide ads for the venue 200. As discussed above, the ads may be still images or streaming video and may be directed to the venue 200 itself or for the related businesses 202-206 (see FIG. 3). In addition, the ads may be for businesses near the venue 200 (or for other venues in the JUMMMP network). The centralized ad server 230 in the JUMMMP Cloud 216 simplifies the network architecture within the venue 200 and other venues by eliminating the need for an ad server within each venue.

A data base server 232 in the JUMMMP Cloud 216 may be configured to collect a broad range of information regarding the UEs 110 (including the user profile information stored in the memory 156 (see FIG. 2) of the UE that was provided when the UE was first identified in the venue. The profile information will help provide targeting marketing and advertising to the UE 110 as it traverses the venue. In addition, the profile information may be used to select the streaming videos that may be provided to the user. For example, if the user profile indicates that the owner of the UE 110 is an avid football fan, the selections of video streams may include multiple football games. As previously discussed, the heartbeat signal from the UE 110 may include geo-location data. The database server 232 is configured to store location information, along with time/date data to thereby track movements of the UE 110.

The UE 110 must register with the system 100 at some initial point in time. The initial registration can be performed remotely using, by way of example, a personal computer (not shown) connected to the JUMMMP Cloud 216 via the network 210. In another variation, the UE 110 can perform an initial registration as it enters the venue 200 illustrated in FIG. 4, as described above. When the UE 110 initially contacts one of the APs 108, the policy controller server 220 will not have any data related to the particular UE 110. In this case, that initial AP 108 in the venue 200 may perform an initial registration. For the initial registration, the UE 110 can connect to the initial AP 108 and provide identification information. In an exemplary embodiment, the user can complete the initial registration process by providing data, such as the telephone ID (i.e., the phone number), a device ID, a user ID, and an email address as well as other information, such as the user profile data stored in the memory 156 (see FIG. 2) of the UE 110. The user ID may be a user generated name, nickname, or the like. The device ID may vary based on the particular type of the UE 110. For example, if the UE 110 utilizes an Android™ operating system, the device will be assigned an Android™ ID. In addition, the UE 110 may typically be assigned an international mobile equipment identification (IMEI). Any of these device identifications alone may be transmitted to the registration server 222. In another alternative embodiment, a unique hash of one or more device IDs may be generated and transmitted to the registration server 222 as the device ID. The short-range transceiver 176 (see FIG. 2) may also include an identification, such as a MAC address that is unique to the UE 110. The registration data described above can be provided to the registration server 222 along with the MAC address. The registration data may be stored in association with the MAC address. Once the initial registration process has been completed, subsequent authentications are greatly simplified.

In one embodiment, a previously-registered UE 110 may come within range of the initial AP 108 in the venue 200 of FIG. 4 and establish a wireless communication link therewith. In establishing the communication link, the UE 110 transmits its MAC address and/or the phone ID or IMEI. The AP 108 transmits an authentication request message to the registration server 222 to determine whether the UE 110 is a registered device. Based on the MAC address, the registration server 222 can confirm that the UE 110 has previously registered. Thus, the UE 110 is authenticated whenever it comes into range of an AP 108 of the system 100. This may occur transparently to the user. This automatic authentication process can occur even if the initial registration was in a completely different part of the country. Thus, the UE 110 may move from one venue 200 to another in the same city or region or may be in a completely different part of the country and be automatically identified and authenticated with APs 108 that are part of the system 100 described herein. This convenient registration and authentication avoids the need for constantly searching for a WiFi connection as required by other systems. Based on this automatic authentication process, the UE 110 may be automatically connected to the WiFi network created by the APs 108 in the venue 200.

Figure 5:
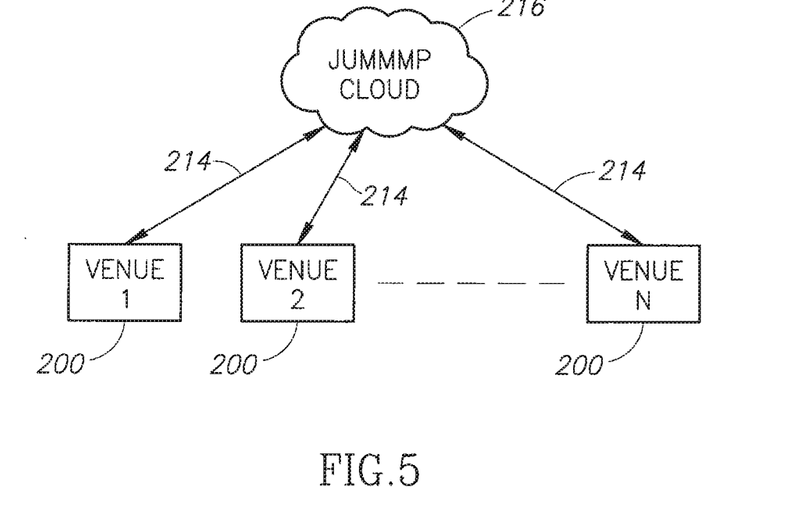
FIG. 5 illustrates the Cloud network of FIG. 4 communicating with multiple venues.

The registration process at a single venue has been discussed above with respect to FIG. 4. The JUMMMP Cloud 216 also advantageously provides a centralized registration function for multiple venues, as illustrated in FIG. 5. The multiple venues 200 are each connected to the JUMMMP Cloud 216 via individual respective backhauls 214. If a UE 110 initially registers at Venue 1, using the registration process described above, that registration information is stored in the JUMMMP Cloud 416. At a later point in time when the user enters, by way of example, Venue 2 illustrated in FIG. 5, the UE 110 will automatically identify the AP 108 and begin to communicate therewith. Because the UE 110 has already been registered, that information is passed along to the JUMMMP Cloud 216 and the UE is automatically authenticated. This is true even if the various venues 200 are located far from one another. For example, an initial registration of the UE 110 may take place at a sports venue in, by way of example, New York City. However, if the UE 110 is carried to a casino in, by way of example, Las Vegas, Nev., the UE 110 will automatically begin to communicate with the AP 108 in the new venue in Las Vegas. Because each venue is coupled to the JUMMMP Cloud 216, the UE 110 need not undergo another registration process when it enters the venue 200 in Las Vegas. Thus, a single registration process at any venue is sufficient for registration with the JUMMMP Cloud 216. Whenever the UE 110 goes into a different venue 200 that is coupled to the JUMMMP Cloud 216, the UE 110 is automatically recognized and authenticated.

Figure 6:
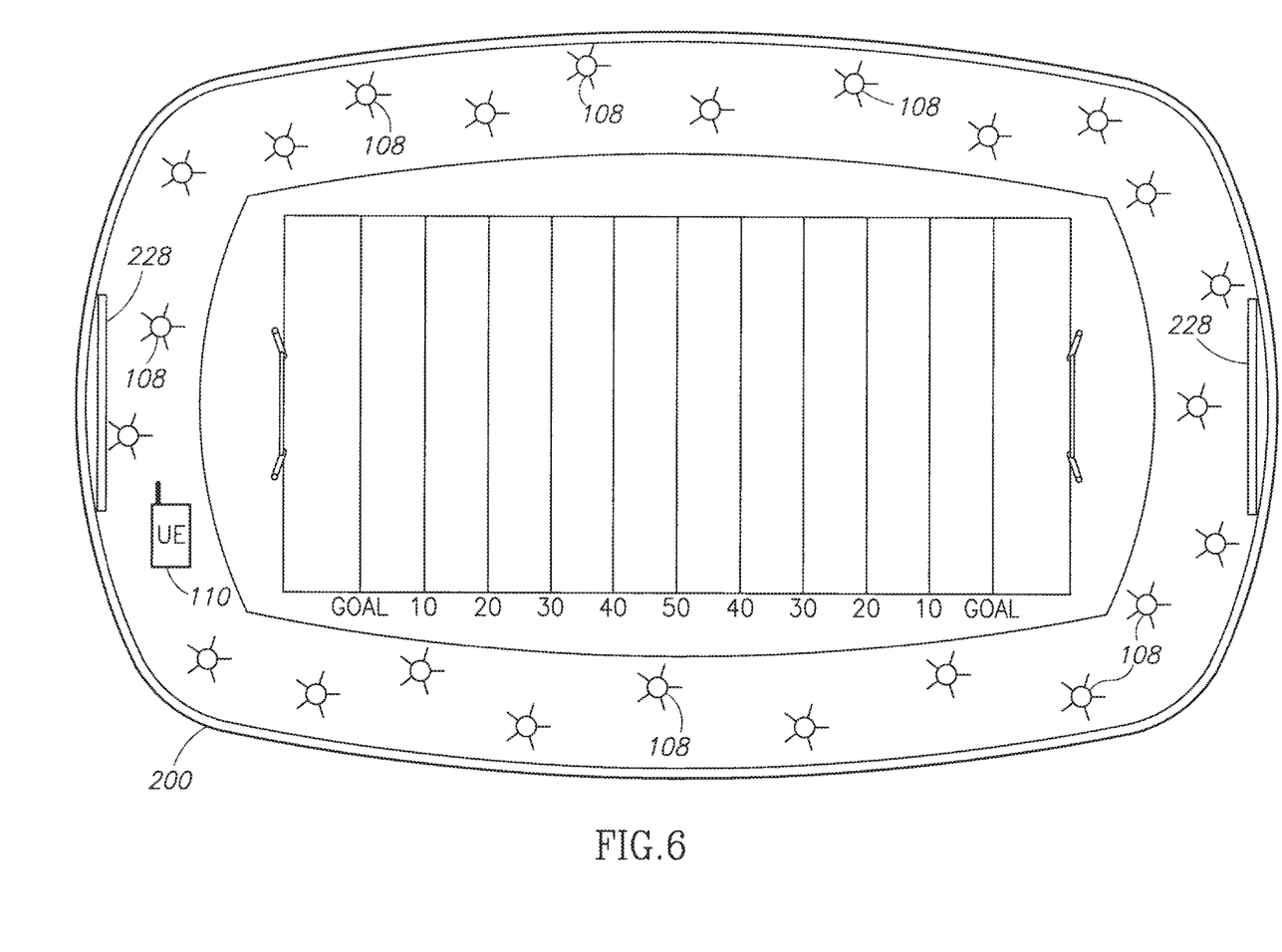
FIG. 6 illustrates a large array of wireless access points distributed throughout a sports venue.

In another example of a business-related implementation, the venue 200 may be a football stadium, as illustrated in FIG. 6, or some other sports venue. In this embodiment, the APs 108 are distributed throughout the structure of the sports venue. The UE 110 communicates with one or more of the APs 108 in the manner described above. The UE 110 can perform an initial registration process or an automatic authentication process, as described above. The APs 108 maintain virtually continuous contact with the UE 110 while it is within the sports venue 200. As discussed with respect to FIG. 4, the APs 108 are coupled to the infrastructure 106 to allow the distribution of multiple video channels to all of the UEs 110 within the sports venue 200. For example, one video channel can provide an overall view of the playing field while other video channels may provide close-up video streams of the line play, the quarterback, the receivers, and the like. The user may select which video stream to view on the UE 110. However, all of the video streams described above may be made available for selection by any of the UEs 110 within the venue 200. In addition, the JUMMMP Cloud 216 can disseminate information to the UEs 110 in the manner described above. The disseminated information may be in the form of advertisements from vendors within the venue 200, future availability of videos (e.g., upcoming sports events), and the like.

The JUMMMP Cloud 216 may also provide streaming video to the UE 110. For example, if the sports venue in FIG. 6 is a football stadium, the JUMMMP Cloud 216 may provide streaming video highlights or even complete games from a different football stadium that is also coupled to the JUMMMP Cloud 216. While some stadiums provide selected replays on a large screen TV or other display 228 for fans, such displays are not available if the user is away from the field to get a drink, go to the bathroom, etc. However, with the system described herein, the instant replay may be provided directly to the UE 110 at virtually any location throughout the sports venue 200. In this embodiment, the instant replay may be multicast to all UEs 110 within the sports venue 200 by the multitude of APs 108. Alternatively, the system 100 can provide a video channel with a delay (e.g., 30 seconds) so that the UE 110 can always go back and review recent plays. Those skilled in the art will appreciate that the instant replay described herein is distinct from an "on-demand" form of instant replay. An on-demand system requires unicast delivery of the instant replay to each and every UE that transmits such a request. As discussed above, unicast delivery of video would quickly consume all available bandwidth in a typical AP 108. Accordingly, the instant replay described herein refers to video replay that is under control of the sender (e.g., the video server 104 in FIG. 1). The video server 104 selects the video that will be made available as a replay and transmits the replay video as a series of UDP packets with a separate port number, as described above. Thus, the instant replay is a multicast video stream available to all UEs 110 as a separate channel. The user can simply switch to the replay channel to view this video stream.

In one embodiment, the instant replay for the venue 200 (see FIG. 4) may be provided by the JUMMMP Cloud 216 to the video server 104 (see FIG. 1). In yet another embodiment, the video server 104 (see FIG. 1) receives a local feed of the streaming media or instant replay for activities within that local sports stadium.

Figure 7:
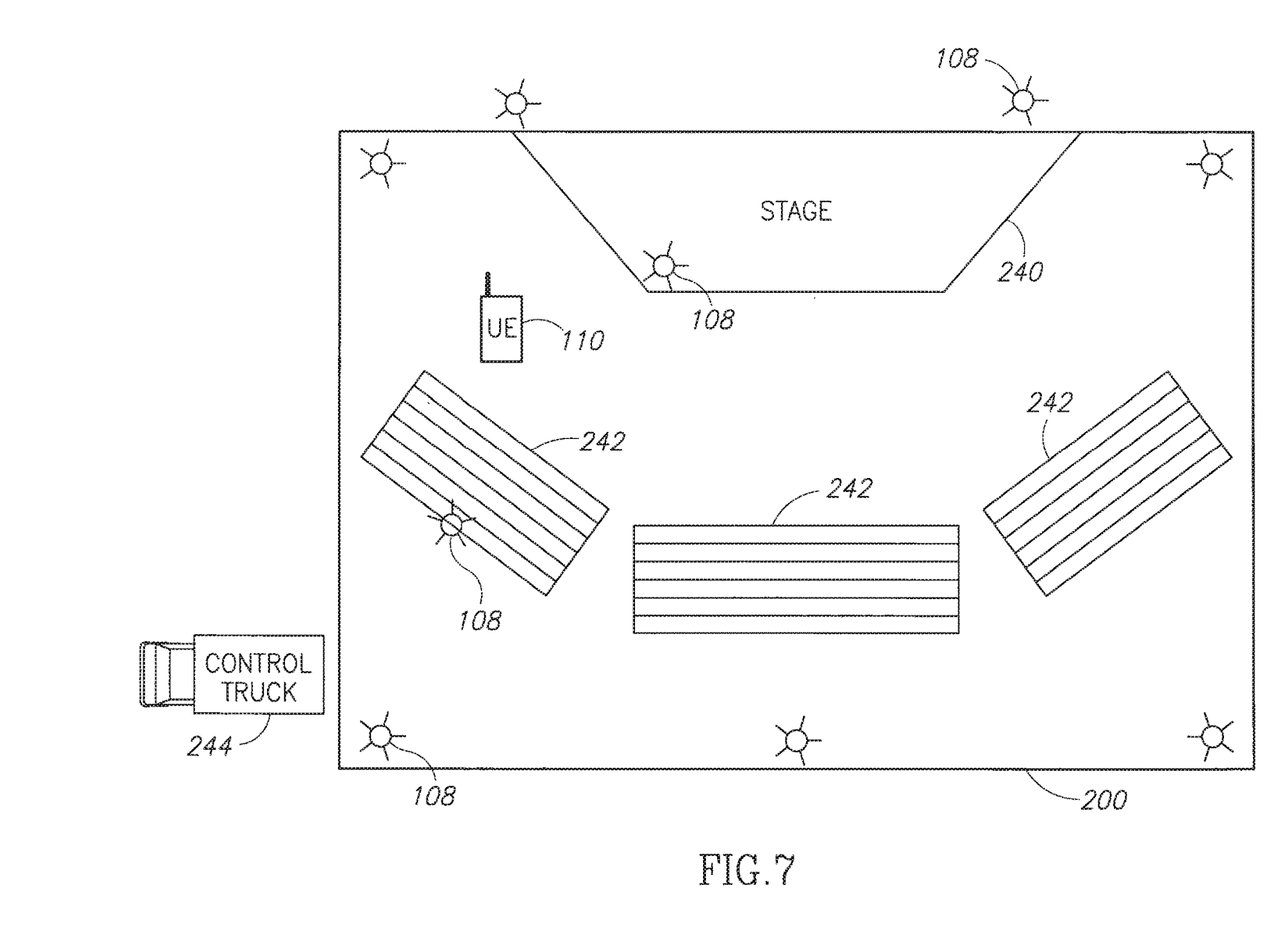
FIG. 7 illustrates an array of wireless access points distributed throughout a concert venue.

In the examples provided above, the APs 108 are in fixed locations throughout the venue 200 to maximize coverage throughout the venue. This is true whether the venue 200 is a fixed facility, such as the casino venue or sports venue. However, the system described herein is flexible enough to provide temporary coverage in a venue that does not have preexisting coverage. For example, a concert hall may not have existing coverage through a network of APs as described above. For example, a concert venue at the state fair may be temporary in nature. Similarly, a concert venue may be constructed temporarily at an open air location (e.g., Woodstock or a speedway). In yet another example, some venues, such as a racetrack or a golf course, may not have an existing infrastructure of APs 108. In yet another example embodiment, the system described herein can provide a temporary mobile venue infrastructure, which may be referred to herein as "WiFi on Wheels" (WoW). An example of a WoW implementation is illustrated in FIG. 7. The example of FIG. 7 is a temporary concert venue, such as may be common at a state fair or other location. A stage 240 and grandstands 242 may be positioned within the venue 200. The location of the APs 108 throughout the venue 200 may be dependent on the location of the stage 240 and the grandstands 242 to provide the necessary coverage. In this embodiment, the APs 108 may be mounted on existing infrastructure, such as telephone poles, light poles, and the like. The APs 108 may also be mounted directly to the stage 240 or the grandstand 242. A control truck 244 or other mobile vehicle may contain the additional infrastructure for the temporary concert venue 200. For example, the control truck 244 may contain the video server and infrastructure 106 (see FIG. 1) to provide the necessary connection to the JUMMMP Cloud 216. The control truck 244 may also include a satellite link to implement the backhaul 214. The backhaul 214 can also be implemented as a microwave link from the control truck 244 or a hardwired connection if available. Thus, the WoW implementation of FIG. 7 can be set up and removed in a relatively short period of time.

In operation, the concert venue 200 operates in the same manner described above with respect to other venues. That is, the UE 110 is automatically authenticated if the UE 110 has previously been authenticated with the JUMMMP Cloud 216. If the UE 110 has never been registered with the JUMMMP Cloud 216, the UE undergoes an initial registration process described above with respect to FIG. 4. Thus, the concert venue 200 operates in a functionally identical manner to the fixed venues described above. For example, the concert venue 200 in FIG. 7 may offer multiple video channels such as an overall view of the concert stage, close-ups of the concert stage, close-ups of individual performers on the stage, or the like. The user can simply select the desired streaming video channel from the available selection shown on the display 154 (see FIG. 2). In addition, as described above, the venue 200 may provide video advertisements on the selected channel.

In an alternative embodiment, the video server 104 (see FIG. 1) can send command data to all APs 108 within the venue 200 or to selected APs within the venue to force the UEs 110 to change port numbers for processing by the CPU1 (see FIG. 2). This effectively causes the UE 110 to "change channels." That is, the UE 110 receives a data command and changes the port number for the received UDP data packets. As described above, the CPU1 will identify and save all UDP data packets having a selected port number. In this instance, the initial port number is altered via a data command from the video server 104.

For example, in the sports venue 200 illustrated in FIG. 6, it may be possible to cause some or all of the UEs 110 to change channels and receive a commercial during a time out. After the commercial, or when the time out ends, the individual UEs 110 can automatically revert back to the original channel by reinstating the initial port number used by the CPU1. Alternatively, the UEs 110 can switch back to the initial port number upon receipt of an additional data command from the video server 104.

Examples of the multiple video channels in a venue have been provided for a casino, a football stadium, and a concert venue. However, those skilled in the art will appreciate that the principles of the system 100 can be readily extended to other settings. For example, a race track (i.e., an auto race track or a horse race track) can provide streaming video to the UEs 110 from different vantage points throughout the race track. For example, in the case of automobile racing, it is possible to have one or more video channels directed to the pit area, video channels for different turns or portions of the race track, video channels that focus on individual race leaders or fan favorites, in-car video, and the like. The UE 110 can simply select which streaming video to receive by selecting the appropriate channel in the manner described above. In addition, the user can readily change channels at the push of a button.

In another example, APs 108 may be distributed around a golf course during a golf tournament. Because a golf tournament generally lasts only a few days, the temporary installation described above with respect to a concert venue may be applicable here as well. That is, APs 108 may be distributed throughout the golf course and coupled to the control truck 244 (see FIG. 7) or other control installation. In this embodiment, the video server 104 (see FIG. 1) is typically installed within the control truck 244 or other control installation. In this example, various video streams could be provided for different holes on the golf course, video of individual players, such as the current leaders, fan favorites or the like. Again, the UE 110 simply selects the desired video stream from among the available selections by activating a selected channel on the display 154 (see FIG. 2).

Although several example venues and applications have been discussed herein, those skilled in the art will appreciate that the system is not limited to these examples. Thus, the system described herein enables the delivery of a large number of video streams via a network of APs and allows each UE to select which channel to view.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for the transmission of video data to a plurality of mobile communication devices, comprising:
receiving a plurality of video streams;
converting the plurality of video streams to a single stream of video data packets with each of a plurality of video data packets for a respective one of the video streams being assigned a port number corresponding to the respective video stream;

transmitting the single stream of video data packets from each of a plurality of wireless access points (APs);

in each of the plurality of mobile communication devices communicatively coupled to at least one of the plurality of APs, receiving the single stream of video data packets and extracting ones of the single stream of video data packets having a selected port number to thereby extract one of the plurality of video streams from the single stream of video data packets; and displaying the extracted video stream on a display of the respective ones of the plurality of mobile communication devices.

2. The method of claim 1 wherein the stream of video data packets are generated using a User Datagram Protocol.

3. The method of claim 1, further comprising sensing user operation of an input element on a first of the plurality of mobile communication devices to alter the selected port number to thereby cause the first mobile communication device to receive different ones of the stream of video data packets having the altered port number to thereby receive and display a different video stream corresponding to the altered port number.

4. The method of claim 3, further comprising sensing user operation of an input element on a first of the plurality of mobile communication devices to change back from the altered port number to the initial port number to cause the first mobile communication device to receive ones of the stream of video data packets having the initial port number to thereby receive and display the video stream corresponding to the initial port number.

5. The method of claim 1 wherein a first of the plurality of mobile communication devices is configured to receive ones of the stream of video data packets having an initial port number, the method further comprising sensing reception of command data, transmitted from one of the plurality of APs, at the first mobile communication device to thereby alter the initial port number and cause the first mobile communication device to receive different ones of the stream of video data packets having the altered port number to thereby receive and display a different video stream corresponding to the altered port number.

6. The method of claim 5 wherein changing back from the altered port number to the initial port number is in response to sensing reception of command data, transmitted from one of the plurality of APs, at the first mobile communication device to thereby change the altered port number to the initial port number.

7. The method of claim 1, further comprising:

the plurality of mobile communication devices receiving guide data transmitted from at least one of the plurality of APs, the guide data providing information about the content of each of the plurality of video streams;

displaying the received guide data on the display of the respective ones of the plurality of mobile communication devices;

sensing user operation of an input element on a first of the plurality of mobile communication devices to select a desired video stream based on the displayed guide data; and receiving ones of the stream of video data packets having a port number corresponding to the user-selected video stream.

8. A system for the transmission of a plurality of video streams, comprising:

a server configured to receive the plurality of video streams and to convert the plurality of video streams to a single stream of video data packets with each of the plurality of video data packets for respective ones of the video streams being assigned a port number corresponding to the respective video stream;

a plurality of wireless access points (APs) communicatively coupled to the server to receive the video packets therefrom, the APs being configured to transmit the stream of video packets;

a routing infrastructure coupled to the server and the plurality of APs to relay communications between the server and the plurality of APs, the routing infrastructure being configured to route the stream of video data packets to selected ones of the plurality of APs; and a plurality of mobile communication devices, each having:

a short-range transceiver configured to communicate with at least one of the plurality of APs and receive data therefrom, the received data comprising the stream of video data packets;

a processor configured to select a port number corresponding to a desired one of the plurality of video streams wherein the processor is configured to extract the data packets having the selected port number from the single stream of video data packets to thereby extract the desired one of the plurality of video streams from the single stream of video data packets;

a memory device configured to store the extracted data packets having the selected port number;

a display; and a video player configured to play the stored data packets to thereby play the desired one of the plurality of video streams on the display.

9. The system of claim 8 wherein the server is further configured to convert the plurality of video streams to a single stream of video data packets using a User Datagram Protocol.

10. The system of claim 8, further comprising a user operable input element on a first of the plurality of mobile communication devices operable to alter the selected port number to thereby cause the first mobile communication device to receive different ones of the stream of video data packets having the altered port number to thereby receive and display a different video stream corresponding to the altered port number.

11. The system of claim 10 wherein the user operable input element on the first of the plurality of mobile communication devices is further operable to change back from the altered port number to the initial port number to cause the first mobile communication device to receive ones of the stream of video data packets having the initial port number to thereby receive and display the video stream corresponding to the initial port number.

12. The system of claim 8 wherein a first of the plurality of mobile communication devices is configured to receive ones of the stream of video data packets having an initial port number, the system further comprising the processor in the first mobile communication device being configured to sense reception of command data, transmitted from at least one of the plurality of APs, to thereby alter the initial port number and cause the first mobile communication device to receive different ones of the stream of video data packets having the altered port number to thereby receive and display a different video stream corresponding to the altered port number.

13. The system of claim 12 wherein the processor in the first mobile communication device is further configured to sense reception of additional command data, transmitted from at least one of the plurality of APs, to thereby change back from the altered port number to the initial port number in response to the reception of the command data to thereby change the altered port number to the initial port number.

14. The system of claim 8, further comprising:
- the short-range transceiver in each of the plurality of mobile communication devices being further configured to receive guide data, transmitted from at least one of the plurality of APs, the guide data providing information about the content of each of the plurality of video streams;
- the processor in each of the plurality of mobile communication devices being further configured to display the received guide data on the display of the respective ones of the plurality of mobile communication devices;
- the processor in each of the plurality of mobile communication devices being further configured to sense user operation of an input element on the respective ones of the plurality of mobile communication devices to select a desired video stream based on the displayed guide data; and
- the short-range transceiver in each of the plurality of mobile communication devices being further configured to receive ones of the stream of video data packets having a port number corresponding to the user-selected video stream.

\* \* \* \* \*